(12) United States Patent
Broberg

(10) Patent No.: US 8,850,506 B2
(45) Date of Patent: Sep. 30, 2014

(54) TUNING RESOLVER

(75) Inventor: David K. Broberg, Lafayette, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 1631 days.

(21) Appl. No.: 11/936,297

(22) Filed: Nov. 7, 2007

(65) Prior Publication Data

US 2009/0119728 A1 May 7, 2009

(51) Int. Cl.
*H04H 60/33* (2008.01)
*H04N 7/173* (2011.01)
*H04N 7/16* (2011.01)
*H04L 12/28* (2006.01)

(52) U.S. Cl.
CPC .................................. *H04L 12/2801* (2013.01)
USPC ................... 725/127; 725/9; 725/86; 725/95; 725/100; 725/105; 725/109; 725/110; 725/117; 725/119; 725/120; 725/131; 725/149; 725/151

(58) Field of Classification Search
CPC . H04N 21/238; H04N 21/2385; H04N 21/24; H04N 21/2402; H04N 21/2408; H04N 21/26216; H04N 21/4104; H04N 21/437; H04N 21/61; H04N 21/658
USPC .................. 725/9, 16, 86, 105, 117
See application file for complete search history.

(56) References Cited

U.S. PATENT DOCUMENTS

| | | | |
|---|---|---|---|
| 2005/0055721 A1* | 3/2005 | Zigmond et al. | 725/78 |
| 2006/0225106 A1* | 10/2006 | Bedingfield, Sr. | 725/95 |
| 2006/0242664 A1* | 10/2006 | Kikkawa et al. | 725/37 |
| 2007/0186259 A1* | 8/2007 | Pedlow et al. | 725/120 |
| 2007/0204291 A1* | 8/2007 | Ichihashi | 725/33 |
| 2008/0229379 A1* | 9/2008 | Akhter | 725/139 |
| 2009/0025027 A1* | 1/2009 | Craner | 725/32 |

OTHER PUBLICATIONS

TiVo Community Forum, TiVo Series3 HDTV DVRs, SDV FAQ, 17 pages, Jul. 2007.*
Comments of the National Cable & Telecommunications Association, Regulatory Filing, Aug. 2007, pp. 1-7 & 32-33.*
TiVo Community Forum, TiVo Series3 HDTV DVRs, SDV—The elephant in the room, 21 pages, 2007.
TiVo Community Forum, Series3 question, TiVo Coffee House—TiVo Discussion, 16 pages, 2007.
"Some interesting news about Switched Digital Video", 9 pages, Jul. 24, 2007.

* cited by examiner

*Primary Examiner* — Nasser Goodarzi
*Assistant Examiner* — Kyu Chae
(74) *Attorney, Agent, or Firm* — Great Lakes Intellectual Property, PLLC.

(57) ABSTRACT

A method and system for supporting media services on devices lacking capabilities to execute reverse transmission communicates necessary to request and/or locate the services. The method and system may be suitable for use with switched broadcast television (SBT) system having unidirectional digital cable products (UDCPs) which are unable to execute reverse transmission communicates necessary to support SBT.

24 Claims, 2 Drawing Sheets

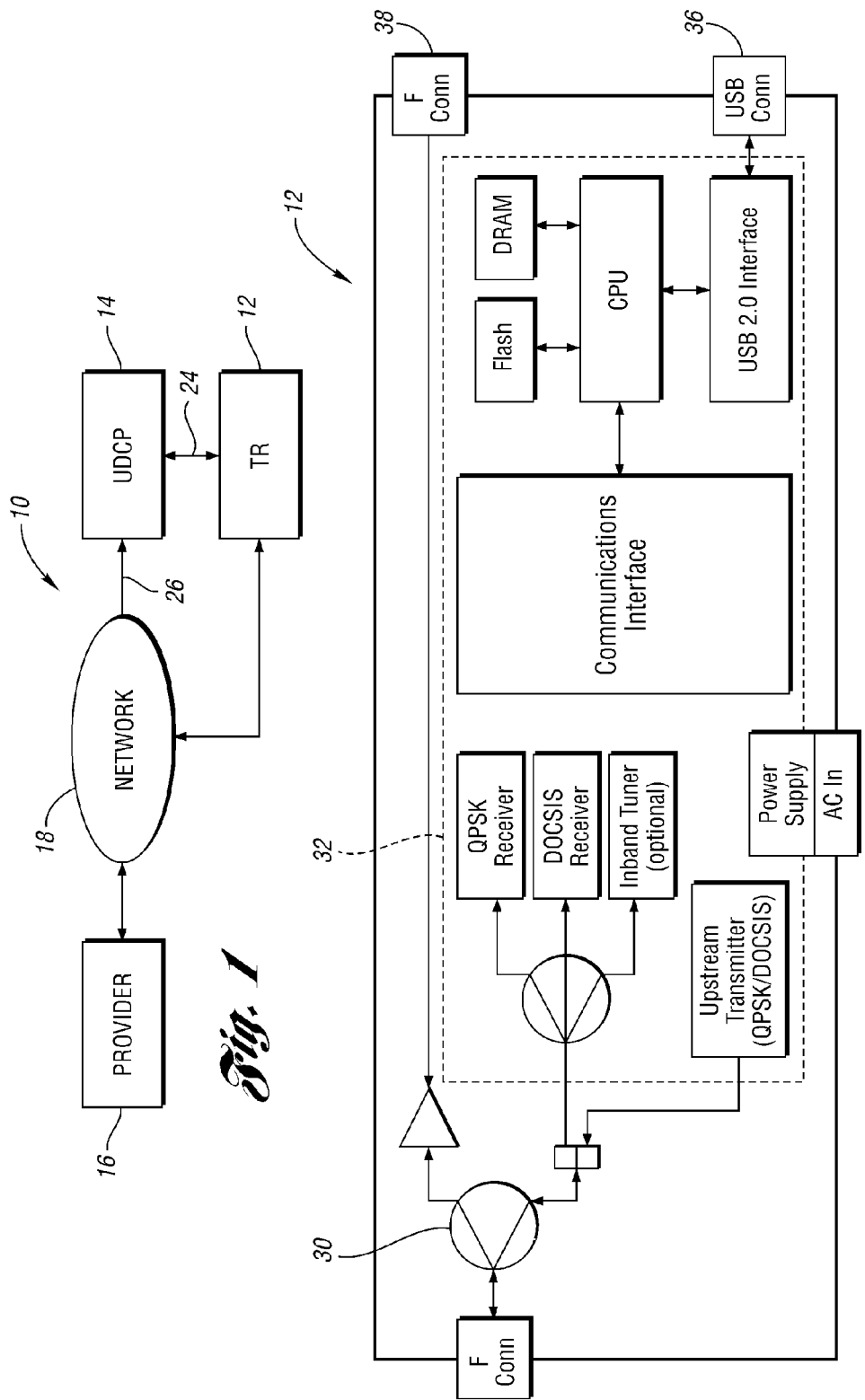

TUNING RESOLVER

BACKGROUND OF THE INVENTION

1. Field of the Invention

The present invention relates to a tuning resolver configured to support bidirectional communications associated with switched broadcast television (SBT) or other services requiring reverse transmissions.

2. Background Art

Switched broadcast television (SBT) allows television service providers to transmit television signals over a broadcast and switched transmission tiers. The television channels transmitted over the broadcast tier are continuously broadcasted regardless of customer requests to view the channels. The television channels transmitted over the switched tier are transmitted when customers request the channels. When a particular switched tier channel is requested and it is not currently being broadcasted, the provider assigns the associated content for transmission over a particular frequency range, commonly using a QAM channel on an unused portion of a communication spectrum.

A customer requesting the switched tier channel must communicate the request to the SBT provider in order to initiate transmission of the service and to determine its location within the communication spectrum. Some customer premise equipment (CPE), however, are unable to communicate with the SBT provider in a manner sufficient to make the request. Unidirectional digital cable products (UDCPs), for example, are one class of CPE that are unable to communicate switched tier channel request to the SBT provider.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 1 illustrates a tuning resolver (TR) system in accordance with one non-limiting aspect of the present invention;

FIG. 2 illustrates the TR having a splitter in accordance with one non-limiting aspect of the present invention.

DETAILED DESCRIPTION OF THE PREFERRED EMBODIMENT(S)

Figure 3:
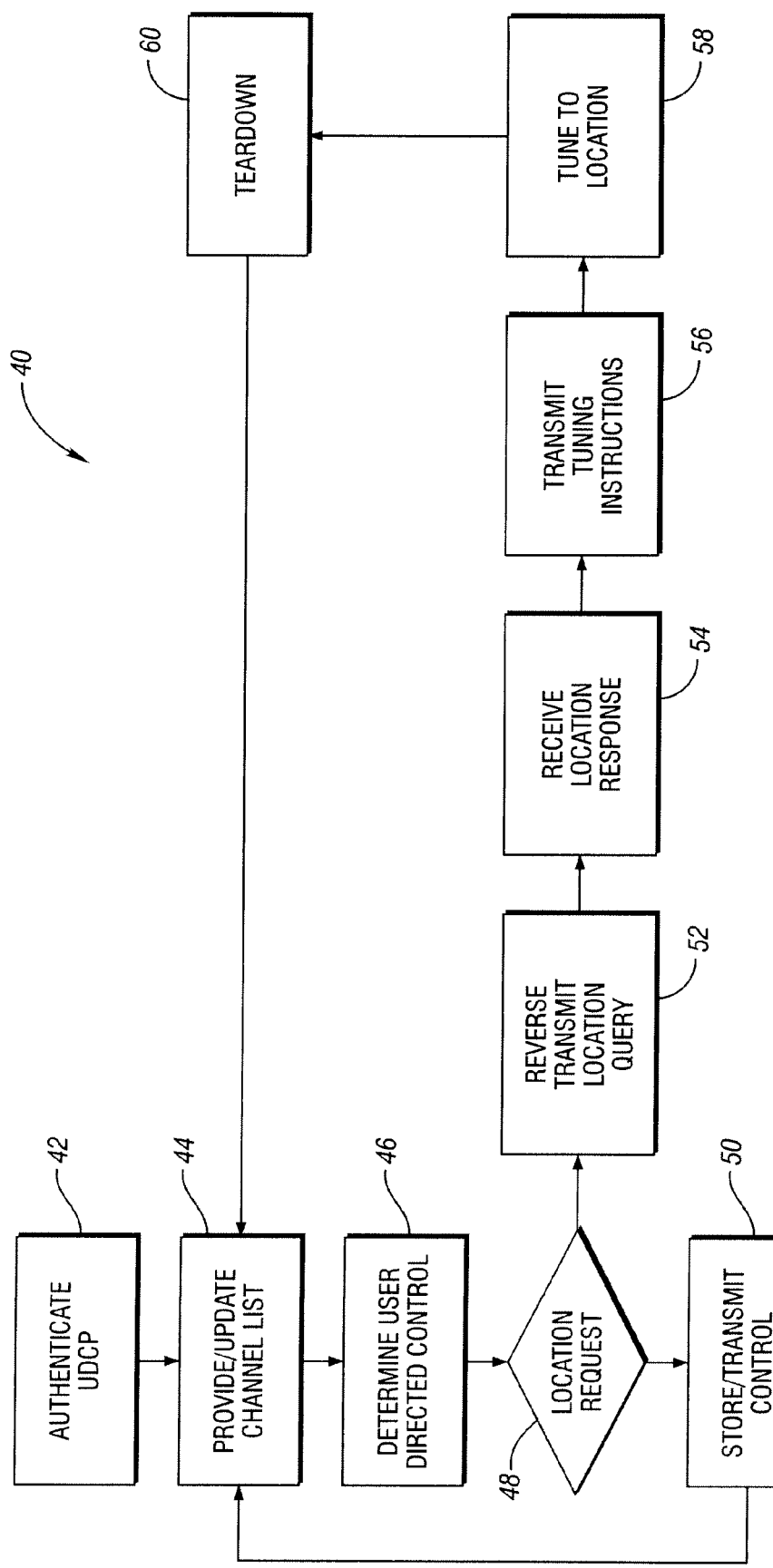
FIG. 3 illustrates a flowchart for a method of supporting reverse transmission reliant services in accordance with one non-limiting aspect of the present invention.

FIG. 1 illustrates a tuning resolver (TR) system 10 in accordance with one non-limiting aspect of the present invention. The system 10 may include a TR 12 configured to support switched broadcast television (SBT) or other reverse transmission reliant services on a unidirectional digital cable product (UDCP) 14 or other device that is unable to support bidirectional communications. Because the UDCP 14 lacks the reverse transmission capabilities, the TR 12 may be configured to provide the needed reverse transmission capabilities so that the various services available to the UDCP 14 can be accessed as if the UDCP 14 had reverse transmission capabilities.

The TR 12 can be used in any environment where a content provider 16 provides services that require reverse transmission capabilities. The provider 16 may be associated with any type of media provider 16 having capabilities to transmit media and/or any number of affiliated or non-affiliated content sources having capabilities to transmit content to the UDCP 14. For exemplary purposes and without intending to limit the scope and contemplation of the present invention, the TR 12 may be associated with a multiple system operator (MSO) or other entity associated with providing services to any number of subscribers. Such MSO's may include but are not limited to cable, satellite, or broadcast television service providers, communication or cellular providers, internet service providers (data), and the like.

A network 18 may be included to facilitate communications between the provider 16, TR 12, and UDCP 14. The network 18 may be associated with any type of network and include any combination of wireline and/or wireless features and devices to facilitate the electronic transmission of media. The network 18 may include multiple connection points and devices to facilitate media transmission, including but not limited to transmissions occurring through fixed media (CDs, DVDs, portable memory) and transmissions over electronic networks, such as but not limited to wireline and wireless networks. The network 18 is intended to represent a method of transferring electronic media (portable memory) and/or an infrastructure for transferring electronic media (wireline/wireless network).

The UDCP 14 may be associated with any type of access point suitable for interfacing the media and content with the user and/or otherwise processing the media for subsequent use. The UDCP 14 may include but is not limited to a settop box (STB), digital video recorder (DVR), personal computer (PC), television (which may include embedded user interface, conditional access, and/or other processing capabilities), outlet digital adapter (ODA), media access point adapter (MTA), cable modem (CM), personal digital assistant (PDA), computer, mobile device (phone, computer, etc.), personal media device, audio/video player, and/or any other feature having capabilities for processing media.

The TR 12 may include any number of features, logic, and capabilities necessary to execute any number of the operations contemplated by the present invention. The TR 12 may be configured to communicate with the UDCP 14 over a separate communication medium 24 than a broadband connection medium 26 used by the UDCP 14 to communication with the provider 16. The medium 24 between the TR 12 and the UDCP 14 may be any suitable medium such as a USB cable or wireless connection. The TR 12 may then communicate with the provider 16 by way of the network 18 used by the UDCP 14 and/or through some other communication medium. The connection 24 between the UDCP 14 and the TR 12 requires the UDCP 14 to include some minimal level of reverse communications, i.e., at least capabilities sufficient to support the messaging and monitoring contemplated by the present invention. This allows the TR 12 to isolate the communications provided by the UDCP 14 over connection 24 from the network 18 and the broadband connection medium 26. This isolation allows each local operator the ability to use different communications methods and systems when communicating over the network 18 while permitting the UDCP 14 to only be aware of the protocols necessary to communicate with the TR 12 over the communication medium 24.

The TR 12 may be configured to receive service requests from the UDCP 14 and to support the reverse transmission requirements need to implement the request with the provider 16. For exemplary purposes and without intending to limit the scope and contemplation of the present invention, the operation and configuration of the TR 12 is predominately described with respect to SBT where a portion of a number of available channels are carried over a broadcast tier and a switched tier. The present invention, however, is not intended to be limited to exemplary presentation and fully contemplates its use in any environment where reverse transmission is needed.

In an SBT environment, the provider transmits a number of television channels over a broadcast tier and a switched tier. The broadcast tier includes a relatively stable set of channels in so far as the same channels are typically carried continuously over the same portion of the broadband signal. The switched tier includes a relative unstable set of channels in so far as the channels are typically carried over different portions of the broadband signal at different times at the request of the viewers. The channels carried over the switched tier may be considered as on demand channels since the channels are typically transmitted only when they are requested by viewers and only as long as the viewers are actively watching the channels. The switched tier channels are typically removed from the broadband signal (teardown) when they are no longer being requested.

When the switched tier channels are not being broadcasted/requested, the broadband spectrum allocated to the channel can be used to support other services. If the channel is subsequently requested, it can be re-transmitted, typically over another unused portion of the spectrum. This can be problematic for receiving devices unaware of the unique signaling methods used on the network since the location of the channel within the broadband spectrum can change over time. The current location of the channel within the spectrum must be determined for the current time period if access to it is desired. The same problem can be faced with the channels carried over the broadcast tier as some channels may be migrated between the broadcast and switched tiers.

The need to request channels and the need to locate the requested channels, regardless of whether the channels are carried over the switched or broadcast tiers, can be especially problematic to the UDCP 14 since the UDCP 14 lacks the reverse transmission capabilities or the various specialized protocols needed to support the SBT communications required to request and/or locate the desired channel. The TR 12 may take the form of an external adapter (dongle) connected to the UDCP 14 and the provider 16 and configured by the specific network to request and/or locate channels for the UDCP 14, i.e., it may be configured to execute the reverse communications needed to facilitate access to the desired services. This may include the TR 12 requesting the channel and/or its current location from the provider 16, translating location information into instructions suitable for use in with the UDCP 14, and directing the UDCP 14 to tune to a portion of the broadband signal transmitted from the provider 16.

FIG. 2 illustrates the TR 12 having a splitter 30 in accordance with one non-limiting aspect of the present invention. The splitter 30 may be included to eliminate the extra communication mediums associated with separately connecting the TR 12 and the UDCP 14 to the broadband network connection. The splitter 30 may be used to split the broadband signal to both of a processing element 32 of the TR 12 and the UDCP 14. Optionally, the splitter 30 may be configured to filter or not filter a portion of the broadband signal, depending on whether the signal is being carried to the processing element 32 or the UDCP 14. For example, the splitter 30 may be configured to passively pass the signal to the UDCP 14 while filtering out the television signals when passing the signal to the processing element 32, i.e., only passing the VoIP, conditional access (CA), internet, and private data typically transmitted with the television signals (audio and video) carried within the broadband spectrum.

The processing element 32 may be configured to execute the operations contemplated by the present invention. FIG. 2 illustrates an exemplary configuration of the processing element 32 where the processing element includes just the specific elements needed to support communications with the SBT provider 16 and not the features required to descramble or otherwise process the television signals for viewing. These communication elements may include any or all of the following: an upstream transmitter, QPSK receiver, DOCSIS receiver, Inband tuner. In addition the communications interface, flash memory, dynamic random access memory (DRAM), central processing unit (CPU), and universal serial bus (USB) interface are shown to enable the storage and processing of communications between the network, 18 provider 16, and the UDCP 14. The TR 12 may further include a UDCP connection terminal 38 for passing the unidirectional broadband signal to the UDCP 14, and a USB connection terminal 36 for supporting the bidirectional messaging between the UDCP 14 and the TR 12. Of course, the illustrated configuration is only exemplary and is not intended to limit the scope and contemplation of the present invention.

FIG. 3 illustrates a flowchart 40 for a method of supporting reverse transmission reliant services on UDCP in accordance with one non-limiting aspect of the present invention. The method may be used in connection with any type of service which relies on bidirectional communications to support the service and is explained for exemplary purposes with respect to requesting and tuning to SBT channels. While the invention is described in this regard, it may equally be applied to other types of UDCPs and/or other television and non-television related services, such as IPTV, DBS, or QAM-IP hybrid systems.

Block 42 relates to authenticating the UDCP. The TR may be configured for providing direct communication of the network specific protocols to access the provider, such as a headend unit or plant of a cable television service provider. The authentication process may include any reliable process sufficient to identify the UDCP as being authorized or otherwise suitable for use with the TR. This may include the TR querying the UDCP for an identification information and reverse transmitting with the provider to authenticate the UDCP based on the received identification information.

Block 44 relates to the TR providing the UDCP with a channel list. The channel list may be used to indicate the various channels available on the SBT platform. The channel list may be transmitted to the TR from the provider using any number of protocols or transmissions channels in a way understood by the TR and include a channel name and number without listing or otherwise indicating the current location of the channels with the broadband signal. The UDCP may be configured to process the information within the channel list for use with guides and other navigational features or user interfaces supported on the UDCP. The user may interact with these navigation features to select one or more of the channels for viewing, DVR recording, purchasing, etc.

Block 46 relates to determining user directed control of the UDCP. The user directed control may take many forms and be associated with any control of the UDCP. This may include selecting or changing a channel, powering off the UDCP, playback manipulation (pause, fast forward, etc.), recording, programming, adjusting volume, muting, picture, sound or output controls etc. Upon occurrence of any user directed control or a selected one or more of the user directed controls, the UDCP may be configured to issue a corresponding message to the TR. These activity messages may be used by the SBT to prioritize streams for active viewers, preventing unintended teardown or bandwidth recovery.

Block 48 relates to the TR processing the UDCP message to determine whether the corresponding user directed control is a location request. A location request may correspond with any user directed control that requires reverse transmissions, such as a request to tune to a desired channel. If the UDCP includes multiple tuners, such as to support picture-in-picture (PIP) or other types of access ports, the location request may identify the tuner associated with the request. A non-location user directed control may correspond with other user interaction with the UDCP that does not necessarily require reverse transmission, such as powering off the UDCP, playback manipulation (pause, fast forward, etc.), recording, etc.

Block 50 relates to storing the user non-location based user directed control and/or immediately transmitting the requests to the provider. Information associated with these requests may be stored and/or immediately transmitted to the provider for use by the provider in assessing/tracking user interaction with the UDCP, allocating channels between the tiers, stream prioritization, teardown, measuring program popularity, and any number of other operations.

Block 52 relates to the TR transmitting a location query to the STB in response to receiving the location based request from the UDCP. If the requested channel is currently being broadcasted over the network, i.e., its already being transmitted within the television signals carried by the broadband signal, the location query may request the current location of the channel. If the channel is not currently being broadcasted, the request may request the provider to broadcast the channel.

Block 54 relates to the TR receiving a location response from the provider. The location response may indicate the current location of the channel within the broadband signal. The location may be specified according a particular frequency range (QAM) or according to other methodologies suitable to locating the channel such as a URL for an IPTV system or an IP or other unique address for a signal stream, which may depend on the transmission medium and protocols used to broadcast the television signals. The location response may be carried within the private data portion of the broadband signal, i.e., separate from the television signals, which the UDCP may be unable to process and/or using network specific communications protocols or encryption that the UDCP is not able to process. The location response may also include other information associated with processing or otherwise accessing the desired channel.

The location response may include conditional access instructions that can be used by the UDCP to descramble the requested channel. The location response may include a modulation format for specifying demodulation requirements associated with demodulating the requested channel. The location response may include a list of packet identifiers (PIDs) for specifying separate elementary streams associated with the requested program stream. The location response may include a MPEG2 program number specifying demultiplexer parameters for the requested channel. The location response may include a source ID for use in locating an emergency alert system (EAS) channel to tune to instead of the requested channel in the event of an emergency.

Block 56 relates to transmitting tuning instructions from the TR to the UDCP. The tuning instructions may be generated by the TR in response to the location information sent by the provider. The instructions may vary depending on the configuration of the UDCP and may formatted for use by the UDCP in tuning to the requested channel, i.e., its current location within the broadband signal. If the UDCP includes multiple tuners, the tuning instructions may include a local transport stream identifier (LTSID) for use in identifying the transport stream associated with a specific tuner in the current tuning instructions, which can be helpful in insuring the proper tuner, if the UDCP includes multiple tuners, tunes to the desired channel. The TR may also process the other information associated with the location response for inclusion with the tuning instructions, such as to pass along conditional access information, PIDs, MPEG2 program numbers, source IDs, modulation format, etc.

Block 58 relates to the UDCP receiving the tuning instructions from the TR and tuning to the desired channel. Once the desired channel or service is tuned to, the UDCP may output the tuned to content to the user for viewing or it may perform other operations consistent with the tuned to service. The tuning to of the requested channel, including the messaging and operation of the TR with the provider and the UDCP, may be transparent to the user such that the user is unaware of the TR and its operations as if the UDCP were actually supporting the SBT operations itself.

Block 60 relates to a teardown or bandwidth recovery operation. The teardown operation corresponds with removing or attempting to remove one or more of the switched tier channels from the broadband signal. It may be advantageous to remove one or more of the channels if a limited number of (inactive) users are tuned to the channel and/or if the channels are to be migrated to the broadcast tier. The teardown operation may include the provider communicating a activity confirmation message to the TR. The activity confirmation message may include information regarding the desired teardown that can then be relayed to the UDCP. This may include providing a message to the UDCP for display to the user, such as to verify inactivity or to indicate that the tuned to channel is now unavailable or may become unavailable in the future.

The message may also include an opportunity for the user to prevent the teardown by requesting user directed control of the UDCP, such as by the TR instructing the UDCP to display a message requesting user directed control verifying presence to prevent the teardown. The response to this message can be communicated to the TR and relayed to the provider for use by the provider in deciding whether to remove the tuned to channel. Optionally, the provider may poll the TR or the TR may be configured to automatically provide status information or user directed control information to the provider for use in determining whether to communicate the opportunity to prevent the teardown. This information can be used in assessing whether the user is still watching the tuned to channel based on whether the user has paused the channel, muted the program, failed to change the channel or power off the UDCP, etc.

Block 44 may be returned to and the process described above may repeated over time. User directed control of the UDCP may be continuously monitor and used to instigate reverse transmission requests and/or the TR or provider may initiated control of the UDCP. The channel list may be periodically updated by the provider and re-sent to the UDCP from the TR to facilitate updating the UDCP with new channels and services. This may include the provider instructing the TR to instruct the UDCP to display messages and other information associated with the new services, and optionally, the request user directed control response thereto.

As supported above, one non-limiting aspect of the present invention relates to a tuning resolver that can be used to enable access to SBT or switched digital video (SDV) services on UDCP products. The TR may provide the necessary reverse transmitter and private signaling required to communicate SDV tuning requests to the headend. It can "resolve" the tuning information for every tune-request of UDPC and provide detailed information to the UDCP to enable access to these services.

The TR can connect in-line with the RF signal from the cable system to the UDCP and utilize a USB interface for additional communications. The TR can be used to support interactive television services delivered over a variety of systems. The invention may enable UCPs to access SDV services by providing an outboard solution to the reverse transmitters and the proprietary logic necessary to access such services. This can provide an alternate way to gain access to services without having to add the complexities of a middleware solution or reverse transmitters to the receiving device (UCP).

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of supporting switched broadcast television (SBT) on a unidirectional cable product (UCP), the UCP lacking reverse transmission capabilities sufficient to support SBT communications with a SBT provider, the method comprising:
    determining a request from the UCP for tuning to at least one of a number of channels transported within a signal provided by the SBT provider, wherein a location of at least one or more of the channels within the signal varies over time such that a current location for the requested channel within the signal is required to locate and tune to the requested channel for a time period corresponding with the request;
    processing the request with a tuning resolver (TR) removably connected to the UCP;
    reverse transmitting a location query from the TR to the SBT provider for requesting the current location of the requested channel;
    receiving a location response to the location query with the TR, the TR determining the current location of the requested channel based on information included within the location response;
    providing tuning instructions from the TR to the UCP for tuning to the current location of the requested channel; and
    splitting the signal provided from the SBT provider with the TR to both of a first signal path and a second signal path, the first signal path delivering the signal directly to the UCP and the second signal path not delivering the signal to the UCP, including processing the second signal path to receive and determine the location response.

2. The method of claim 1 further comprising processing a data portion of the signal with the TR to facilitate generating the tuning instructions from information included within the location response, including processing the data portion following filtering of the signal with a splitter of the TR, the splitter configured to generate the data portion by filtering out audio and video from the signal and to split at least the audio and video included within the signal to the UCP.

3. The method of claim 1 further comprising including conditional access instructions within the tuning instructions, the conditional access instructions including instructions for use by the UCP in descrambling the requested channel.

4. The method of claim 1 further comprising transmitting user information from the TR to the SBT for use in tracking user interactions with the UCP, including user directed control (channel change, playback manipulation, power-off and/or recording) of the UCP, the user information being based at least in part on signals transmitted to the TR from the UCP.

5. The method of claim 1 further comprising transmitting a channel list to the UCP, the channel list indicating the channels transported within the signal without indicating the location of the listed channels within the signal, including limiting the channel list to a channel number and channel name for each channel transported within the signal.

6. The method of claim 1 further comprising transmitting a teardown message from the TR to the UCP if the requested channel is to become unavailable at the current location of the requested channel within the signal.

7. The method of claim 6 further comprising including instructions within the teardown message offering an opportunity to prevent the requested channel from becoming unavailable, the opportunity requiring user directed control of the UCP.

8. The method of claim 7 further comprising reverse transmitting a teardown response to the teardown message to the SBT from the TR for use by the SBT in deciding whether to execute a teardown operation, the teardown response being determined based on signals communicated from the UCP to the TR and reflective of the user directed control of the UCP.

9. The method of claim 7 further comprising transmitting status information from the TR to the SBT provider for use in scheduling teardown of the requested channel, the status information being based at least in part on signals transmitted to the TR from the UCP.

10. The method of claim 1 further comprising specifying a frequency band within the tuning instructions, the frequency band specifying the current location of the requested channel within the signal.

11. The method of claim 1 further comprising specifying a URL or IP address within the tuning instructions, the URL or IP address specifying the current location of the requested channel within the signal.

12. The method of claim 1 further comprising specifying a modulation format within the tuning instructions, the modulation format specifying demodulation requirements for demodulating the requested channel.

13. The method of claim 1 further comprising specifying a list of packet identifiers (PIDs) within the tuning instructions, the PIDs specifying separate elementary streams associated with the requested program stream.

14. The method of claim 1 further comprising specifying a MPEG2 program number within the tuning instructions, the program number specifying demultiplexer parameters for the requested channel.

15. The method of claim 1 further comprising specifying a source ID within the tuning instructions, the source ID specifying location of an emergency alert system (EAS) channel within the signal to tune to instead of the requested channel in the event of an emergency.

16. The method of claim 1 further comprising specifying a local transport stream identifier (LTSID) for use in identifying a transport stream associated with a specific tuner within the tuning instructions if the UCP includes multiple tuners.

17. The method of claim 1 further comprising:
providing tuning instructions from the TR to the UCP for tuning to the current location of the requested channel within the signal; and
receiving the signal with the TR and passing the signal from the TR to the UCP without descrambling the requested channel with the TR, thereby requiring the UCP to descramble the requested channel.

18. A tuning resolver (TR) configured to facilitate supporting switched services (SS) on a unidirectional product (UP), the UP lacking reverse transmission capabilities sufficient to facilitate SS related communications with a SS provider, the TR comprising:
a processing element configured for determining a request from the UP for tuning to the SS, wherein a location of at least one or more of the SS varies over time such that a current location for the requested SS is required to locate and tune to the requested SS for a time period corresponding with the request;
a housing enclosing the processing element and a first port, a second port and a third port, the housing configured to removably interconnect the UP with the SS provider such that signaling between the UP and SS provider must pass there through, the first, second and third ports operable to establish removable connections to connectors used to pass signaling between the UP and SS provider;
a splitter disposed within the housing relative to the processing element and the first, second and third ports, the splitter operating in cooperation with the processing element such that the first port is operable for interfacing signaling with the SS provider, the second port is operable for passively interfacing signaling between the UP and SS provider, the third port is operable for interfacing non-SS provider originating messaging between the UP and the processing element;
wherein the processing element is configured for reverse transmitting a location query to the SS provider through the first port, the location query requesting the current location of the requested channel;
wherein the processing element is configured for receiving a location response to the location query through the first port, the processing element determining the current location of the requested SS based on information included within the location response; and
wherein the processing element is configured for providing locating instructions to the UP through the third port, the locating instructions instructing the UP as to the current location of the requested SS, the locating instructions requiring the UP to locate signaling provided through the second port in order to tune to the requested SS.

19. The tuner resolver of claim 18 wherein the SS is a scrambled television program included within a television transport stream and each of the first, second and third ports provide removable connections to the connectors, the TR receiving the scrambled television program at the first port and passively relaying the scrambled television program to the UP through the second port without descrambling, the TR filtering out the scrambled television program to generate a data signal that the TR processes to uncover the location response from which the TR generates the locating instructions transmitted through the third port to the UP.

20. A system for supporting switched broadcast television (SBT) comprising:
a SBT source configured to transmit a signal having a number of scrambled channels proportioned over a broadcast and switched tier, wherein a location of at least a portion of the channels within the signal changes over time such that a current location of the channels is required to tune to the channels;
a unidirectional product (UP) configured to tune to and descramble one or more of the channels for viewing by a user, the UP being unable to reverse transmit SBT messages associated with locating the current location of the channels;
a dongle in communication with the SBT source and the UP, the dongle configured to execute reverse transmission communications necessary to locate the current location of the channels within the signal for the UP
wherein the dongle receives the signal and executes the reverse transmission communications with the SBT through a third connection, the dongle includes a processing element configured to:
i. execute the reverse transmission communications necessary to locate the current location of the channels; and
ii. generate the instructions output through the first connection; and
wherein the dongle includes a splitter configured to split the signal transmitted from the SBT to the third connection to both of the processing element and the second connection.

21. The system of claim 20:
wherein the dongle outputs instructions through a first connection for prompting the UP to tune to and descramble the one or more of the channels; and
wherein the dongle outputs the signal to the UP through a second connection.

22. The system of claim 21 wherein the dongle is connected to the UP with a cable removably connected to the first connection and wherein the dongle receives messages from the UP over the cable for use in executing the reverse transmission communications.

23. The system of claim 22 wherein another cable removably connected to the second connection delivers the signal to the UP, and wherein the dongle is unable to descramble the signal to facilitate viewing.

24. The system of claim 20 wherein the splitter is configured to filter out audio and video from the signal split to the processing element such that the audio and video is not passed through to the processing element.

* * * * *